(12) United States Patent
Saito et al.

(10) Patent No.: US 11,687,682 B2
(45) Date of Patent: Jun. 27, 2023

(54) COMPUTING DEVICE SECURITY CABLE

(71) Applicant: International Business Machines Corporation, Armonk, NY (US)

(72) Inventors: Yutaro Saito, Kamakura (JP); Yohichi Miwa, Yokohama (JP); Yutaka Kawai, Tokyo (JP)

(73) Assignee: International Business Machines Corporaton, Armonk, NY (US)

( * ) Notice: Subject to any disclaimer, the term of this patent is extended or adjusted under 35 U.S.C. 154(b) by 681 days.

(21) Appl. No.: 16/538,870

(22) Filed: Aug. 13, 2019

(65) Prior Publication Data
US 2021/0049311 A1    Feb. 18, 2021

(51) Int. Cl.
*G06F 21/88*    (2013.01)
*E05B 73/00*    (2006.01)

(52) U.S. Cl.
CPC .......... *G06F 21/88* (2013.01); *E05B 73/0005* (2013.01); *E05B 73/0082* (2013.01); *E05B 2073/0088* (2013.01)

(58) Field of Classification Search
CPC ......... E05B 2073/0088; E05B 73/0005; E05B 73/0082; G06F 21/88
See application file for complete search history.

(56) References Cited

U.S. PATENT DOCUMENTS

| 9,117,354 | B2 | 8/2015 | Hutzler et al. |
| 10,345,864 | B1* | 7/2019 | Ramirez ............... G06F 1/1679 |
| 2009/0184822 | A1 | 7/2009 | Mahaffey et al. |
| 2016/0081212 | A1 | 3/2016 | Avganim |
| 2016/0145897 | A1 | 5/2016 | Ilislamloo et al. |
| 2016/0246329 | A1* | 8/2016 | Moore .................. G06F 1/1635 |
| 2016/0254613 | A1* | 9/2016 | Choi .................. H01R 13/5829 |
| | | | 439/31 |
| 2017/0038810 | A1* | 2/2017 | Ueki ....................... G06F 1/266 |
| 2022/0058297 | A1* | 2/2022 | Ting ..................... G06F 21/575 |

* cited by examiner

*Primary Examiner* — Quan Zhen Wang
*Assistant Examiner* — Rajsheed O Black-Childress
(74) *Attorney, Agent, or Firm* — Peter Suchecki

(57) ABSTRACT

A security cable can include a restraining cable and a lock unit attached to the restraining cable. The lock unit can be configured to removably fasten to a computing device. The lock unit can be further configured to switch the security cable between a first configuration and a second configuration. In the first configuration, the lock unit can be fastened to the computing device and can place the computing device in an inactive state. In the second configuration, the lock unit can be removable from the computing device and may not place the computing device in the inactive state.

14 Claims, 4 Drawing Sheets

COMPUTING DEVICE SECURITY CABLE

BACKGROUND

The present disclosure relates to computing device security, and more specifically, to hardware and software security for computing devices.

Computing devices, such as laptop computers can be physically tethered to a stationary object, such as a desk, with a wire that includes a locking mechanism. The wire can be looped around a portion of the stationary object, while the locking mechanism is fastened to the computing device. Such a configuration can prevent or impede physical movement of the computing device beyond a limited distance.

SUMMARY

According to embodiments of the present disclosure, a security cable can include a restraining cable. The security cable can also include a lock unit. The lock unit can be attached to the restraining cable. The lock unit can be configured to removably fasten to a computing device. The lock unit can be further configured to switch the security cable between a first configuration and a second configuration. In the first configuration, the lock unit can be fastened to the computing device. In the first configuration, the lock unit can also place the computing device in an inactive state. In the second configuration, the lock unit can be removable from the computing device. In the second configuration, the lock unit may not place the computing device in the inactive state.

According to embodiments of the present disclosure, a system can include a computing device. The system can also include a security cable. The security cable can include a restraining cable. The security cable can also include a lock unit. The lock unit can be attached to the restraining cable. The lock unit can be configured to removably fasten to the computing device. The lock unit can be further configured to switch the security cable between a first configuration and a second configuration. In the first configuration, the lock unit can be fastened to the computing device. In the first configuration, the lock unit can also place the computing device in an inactive state. In the second configuration, the lock unit can be removable from the computing device. In the second configuration, the lock unit may not place the computing device in the inactive state.

According to embodiments of the present disclosure, a security cable can include a restraining cable. The security cable can also include a lock unit. The lock unit can be attached to the restraining cable. The lock unit can have a key interface. The security cable can switch from a first configuration to a second configuration. The switch can be in response to an interaction between a security cable key and the key interface. The lock unit can comprise a set of retractable tabs. The set of retractable tabs can be configured to removably fasten the lock unit to a computing device. In the first configuration, the set of retractable tabs can be in a protruded position. The protruded position can result in the lock unit being fastened to the computing device. The protruded position can also result in the computing device being tethered to a stationary object. In the first configuration, the lock unit can place the computing device in an inactive state by transmitting an instruction. The instruction can be transmitted from a first electronic circuit of the lock unit to a processor of the computing device. In the second configuration, the lock unit can be removable from the computing device. In the second configuration, the lock unit may not place the computing device in the inactive state. The security cable can further comprise a first electronic coupling. The security cable can be configured to supply operating power to the computing device through the first electronic coupling.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
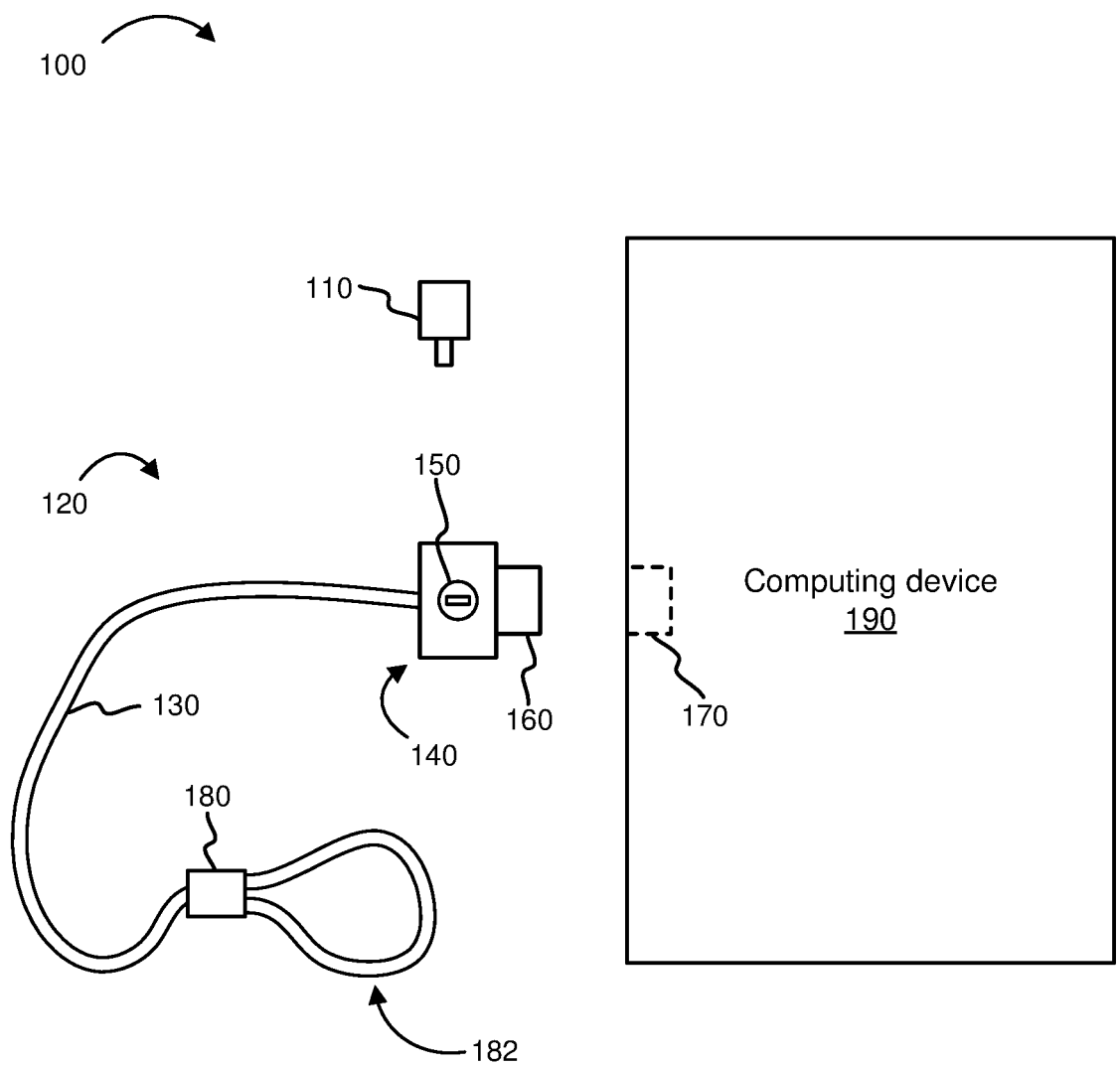
FIG. 1A depicts a security system that includes a security cable, a security cable key, and a computing device, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computing device security; more particular aspects relate to simultaneous hardware and software security for computing devices. While the present disclosure is not necessarily limited to such applications, various aspects of the disclosure can be appreciated through a discussion of various examples using this context.

Computing devices, such as notebook, laptop, and desktop computers can be susceptible to physical theft and/or electronic intrusion. While physical tools can be used to prevent physical theft of a computing device by securing the computing device to a stationary object (e.g., an object that is fixed, relatively large, and/or relatively heavy in comparison to the computing device), such tools may not be useful for preventing electronic intrusion (e.g. unauthorized access to electronic data). Thus, use of such a physical tool may not prevent a person from gaining improper access to electronic data on the computing device, despite the computing device being physically secured. Additionally, if a person were able to defeat (e.g., destroy, sever, etc.) the physical tool and remove the computing device, such person could potentially accomplish both physical theft and electronic intrusion of the computing device.

To address these and other problems, embodiments of the present disclosure include a security cable configured to simultaneously secure a computing device physically and electronically by both tethering the computing device to a stationary object and placing the computing device in an inactive state.

In some embodiments, the security cable can include a lock unit having a first electronic circuit and a key interface. In some embodiments, a physical key can be used with the key interface to switch the lock unit between a first configuration, in which the lock unit can be fastened to the computing device, and a second configuration, in which the lock unit can be removed from the computing device. In some embodiments, in the first configuration, the first electronic circuit can place the computing device in an inactive state. For example, in some embodiments, an inactive state can include a system shutdown, sleep mode, and/or disabling one or more I/O devices of the computing device. In some embodiments, in the second configuration, the first electronic circuit may not affect the state of the computing device.

In some embodiments, the security cable can include a power connector that can supply power to the computing device. In some embodiments, a processor of the computing device can be configured to receive and verify identification information from the security cable before the processor allows the computing device to accept operating power from the security cable.

Turning to the figures, FIG. 1A illustrates a security system 100. The security system 100 can include a security cable 120, a security cable key 110, and a computing device 190.

The security cable 120 can include a restraining cable 130 having a lock unit 140 attached to a first end of the restraining cable 130. The security cable 120 can further include a ferrule unit 180 that clamps the restraining cable 130 such that the restraining cable 130 forms a cable loop 182 at a second end of the restraining cable 130. In some embodiments, the security cable 120 can form a tether when the restraining cable 130 is looped around a stationary object, the lock unit 140 is subsequently passed through the cable loop 182, and then the lock unit 140 is fastened to the computing device 190 in a first configuration, described in further detail below. In some embodiments, using the security cable 120 to tether the computing device 190 to a stationary object can include securing the computing device 190 to the stationary object such that the computing device 190 is restricted from being moved beyond a fixed distance from the stationary object. In some embodiments, a stationary object to which the security cable 120 can be tethered can include furniture (e.g., chair, table, desk, etc.) or a structural member or object (e.g., pillar, railing, wall, floor, etc.).

In some embodiments, the lock unit 140 can include a key interface 150 and a lock connector 160. In some embodiments, the key interface 150 can physically and/or electronically interact with a security cable key 110. For example, in some embodiments, the key interface 150 can include a slot and a locking mechanism that can receive a security cable key 110 and switch the lock unit 140 between a locking configuration and an unlocking configuration based on a rotation of the security cable key 110. In another example, in some embodiments, the key interface 150 can include an electronic sensor that can switch the lock unit 140 between a locking configuration and an unlocking configuration based on physical contact with a security cable key 110. In some embodiments, the key interface 150 can include an electronic sensor that can switch the lock unit 140 between a locking configuration and an unlocking configuration based on wireless communication with a security cable key 110. In some embodiments, the lock connector 160 can be installed into a lock entry 170 of a computing device 190 to accomplish one or more of fastening the lock unit 140 to the computing device 190; providing electronic communication between the lock unit 140 and the computing device 190; and providing operating power to the computing device 190.

Figure 1B:
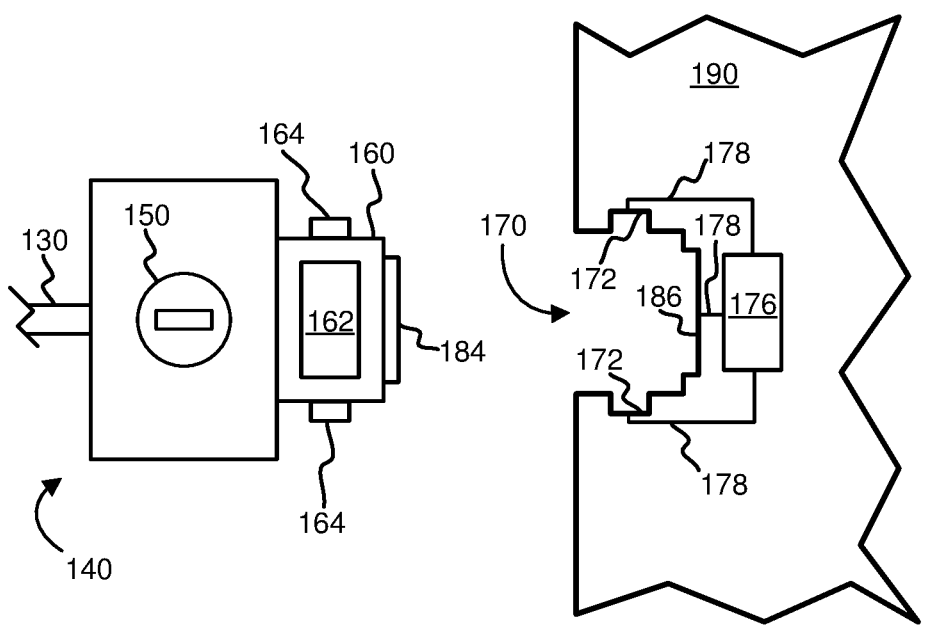
FIG. 1B depicts a detailed view of an uninstalled lock unit and a corresponding lock entry of a computing device, according to embodiments of the present disclosure.

FIG. 1B illustrates a detailed view of an uninstalled lock unit 140 and a corresponding lock entry 170 of a computing device 190, according to embodiments of the present disclosure. (To simplify FIG. 1B, only portions of security cable 120 and computing device 190 are shown). Referring back to FIG. 1B, a lock unit 140 having a lock connector 160 is sized to fit inside lock entry 170 of the computing device 190. In some embodiments, the lock connector 160 can include a first electronic circuit 162, a set of tabs 164, and a first electronic coupling 184.

In some embodiments, the key interface 150 can adjust at least one of the first electronic circuit 162, the set of tabs 164, and the first electronic coupling 184, such that the security cable 120 is switched between a first configuration and a second configuration. In some embodiments, the first configuration of the security cable 120 can include the lock connector 160 being fastened inside the lock entry 170 such that the security cable 120 tethers the computing device 190 to a fixed object. In some embodiments, the first configuration of the security cable 120 can include the first electronic circuit 162 of the security cable 120 communicating with the processor 176 of the computing device 190 and instructing the processor 176 to switch the computing device 190 to an inactive state. In some embodiments, the second configuration of the security cable 120 can include the lock connector 160 being removable from the lock entry 170 and the first electronic circuit 162 of the security cable 120 not affecting an active or inactive state of the computing device.

For example, in some embodiments, in response to an interaction between a security cable key 110 and the key interface 150, the set of tabs 164 can either retract into or protrude from the lock connector 160. Accordingly, the set of tabs 164 can have a protruded position (as shown in FIG. 1B) or a retracted position (not shown). In some embodiments, the retracted position can correspond to an unlocking configuration of the lock unit 140 and a second configuration of the security cable 120. For example, in some embodiments, when the set of tabs 164 is in the retracted position, the lock connector 160 can be installed into or removed from the lock entry 170, as a retracted set of tabs 164 will not interfere with the passage of the lock connector 160 into or out of the lock entry 170.

In some embodiments, the protruded position of the set of tabs 164 can correspond to a locking configuration of the lock unit 140 and a first configuration of the security cable 120. For example, in some embodiments, when the set of tabs 164 is in the protruded position, the lock connector 160 can be blocked from passing through the lock entry 170, as the protruding set of tabs 164 can interfere with one or more surfaces of the lock entry 170. For example, in some embodiments, when the lock connector 160 is installed into the lock entry 170 and an interaction between a security cable key 110 and the key interface 150 places the set of tabs 164 in a protruded position, the set of tabs 164 can extend into recesses 172 of the lock entry. In such embodiments, the lock connector 160 can be blocked from removal from the lock entry 170 due to interference between the set of tabs 164 and the recesses 172. In some embodiments, one or more of the set of tabs 164 can have one or more geometric shapes (e.g., cylindrical, rectangular, triangular, etc.).

In some embodiments, in response to an interaction between a security cable key 110 and the key interface 150, the security cable 120 can be placed into a first configuration in which the first electronic circuit 162 can communicate with the processor 176 via one or more leads 178 and/or an electronic connection between the first electronic coupling 184 and the second electronic coupling 186. For example, in some embodiments, the set of tabs 164 and/or the first electronic coupling 184 can be electronically connected to the first electronic circuit 162 such that they can transmit electronic signals to the processor 176. For example, in some embodiments, when the lock connector 160 is installed into the lock entry 170, the tabs 164 can contact ends of leads 178 and the first electronic coupling 184 can contact the second electronic coupling 186. In such embodiments, electronic signals can be transmitted between the computing device 190 and the security cable 120 through at least one of the tabs 164 and the electronic coupling 184. Accordingly, in these embodiments, the first electronic circuit 162 can transmit an instruction to the processor 176 via leads 178 to place the computing device 190 in an inactive state. In some embodiments, the security cable 120 can require a subsequent interaction between the security cable key 110 and the key interface 150 (e.g., a subsequent contact between the security cable key 110 and the key interface 150) to remove the instruction and permit the computing device 190 to return to an active state. In some embodiments, the instruction may include one or more electronic signals and/or one or more program commands from the first electronic circuit to the processor 176.

Figure 2:
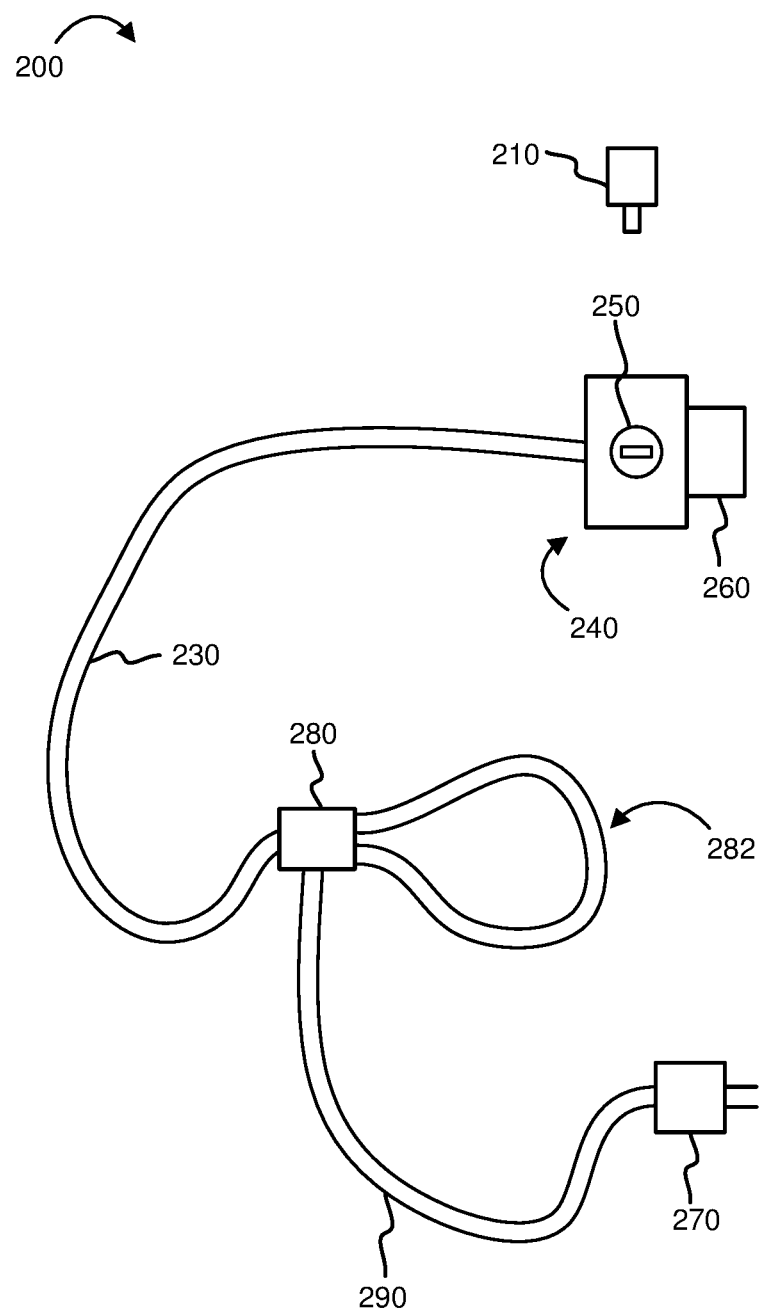
FIG. 2 depicts a security cable having a power-supplying restraining cable, according to embodiments of the present disclosure.

In some embodiments, such as in the embodiment shown in FIG. 2, the first electronic coupling 184 can transmit operating power to the second electronic coupling 186. In some embodiments, operating power can include a quantity of electrical power that is sufficient to operate one or more primary functions of the computing device 190. For example, in some embodiments, operating power can include a quantity of electrical power that it can be sufficient for the computing device 190 to perform at least one of illuminating a display, receiving or transmitting data, and processing data. In some embodiments, the first electronic coupling 184 can transmit a data signal to the processor 176 through the second electronic coupling 186. The data signal can include identification information (e.g., model number, serial number, alphanumeric identification code, etc.) that can identify the security cable 120. In some embodiments, the processor 176 can prohibit the computing device 190 from receiving operating power from an external power source until the processor 176 obtains the identification information. For example, in some embodiments, a user can insert a generic computing device power cord into the second electronic coupling 186. In these embodiments, the processor 176 may not obtain identification information from the generic computing device power cord, and in response, the processor 176 can disable the computing device 190's ability to receive operating power from the generic computing device power cord. Further in this example, a user can replace the generic computing device power cord with security cable 120. In response, the first electronic circuit 162 of the security cable 120 can transmit an alphanumeric identification code to the processor 176 through an electrical connection between the first electronic coupling 184, the leads 178, and the second electronic coupling 186. In some embodiments, the processor 176 can obtain the alphanumeric identification code and compare it to a stored alphanumeric identification code to verify a match between the codes. In some embodiments, if the processor 176 determines that the alphanumeric identification codes match, then in response, the processor 176 can enable the computing device 190's ability to receive operating power from the security cable 120. In this way, a specific security cable can exclusively supply power to the computing device 190 from an external power source.

Figure 1C:
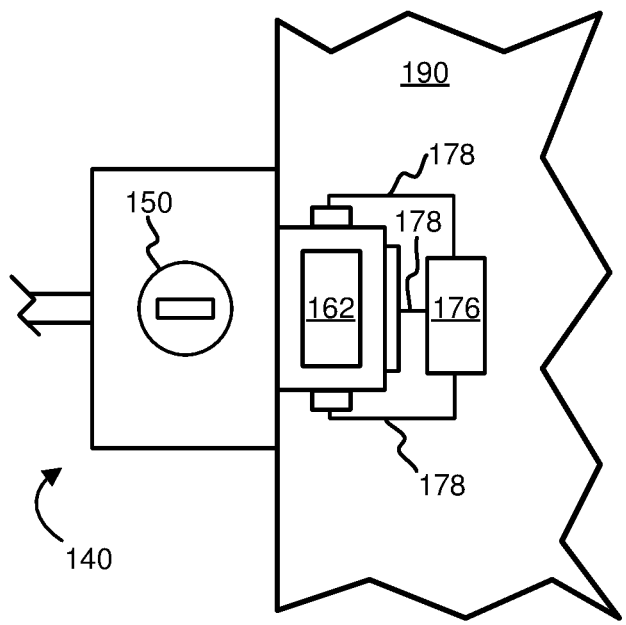
FIG. 1C depicts a detailed view of a lock unit installed within a lock entry of a computing device, according to embodiments of the present disclosure.

FIG. 1C illustrates a detailed view of the lock unit 140 and lock entry 170 of FIG. 1B, where the lock connector 160 of the lock unit 140 is installed inside the lock entry 170. In FIG. 1C, the lock unit 140 is in a locking configuration in which the lock unit 140 is fastened to the computing device 190 due to the tabs 164 protruding from the lock connector 160 into the recesses 172. Additionally, in FIG. 1C, the first electronic circuit 162 can communicate with the processor 176 via leads 178 to place the computing device 190 in an inactive state. In some embodiments, the first electronic circuit 162 and/or the processor 176 can include a computer system, such as the computer system described in FIG. 3.

FIG. 2 illustrates a security cable set 200, according to embodiments of the present disclosure. The security cable set 200 includes a power-supplying restraining cable 230 having a power cord 290 and a power connector 270. The security cable set 200 also includes a security cable key 210. The components of the security cable set 200 (e.g., the security cable key 210, lock unit 240, key interface 250, lock connector 260, and cable loop 282) function the same or a substantially similarly to the functions described above for analogous components of security system 100. However, security cable set 200 can provide power to a computing device through the power connector 270 and the power cord 290. In some embodiments, the power connector 270 can be configured to draw electrical power from a resource such as a battery or a wall outlet. In some embodiments, the power cord can be electrically connected to the lock unit 240 through the power-supplying restraining cable 230 and a ferrule unit 280 that includes power conversion electronics (not shown). In some embodiments, the power-supplying restraining cable 230 can be used to tether a computing device to a stationary object and additionally to supply power to the computing device. In some embodiments, the security cable set 200 can provide an additional layer of computing device security, as a processor of the computing device can be configured to receive and verify identification information from the lock unit 240 before the computing device will accept power from an external source. Thus, in such embodiments, the computing the device may not receive power to operate unless the security cable set 200 is functioning and attached to the computing device.

Figure 3:
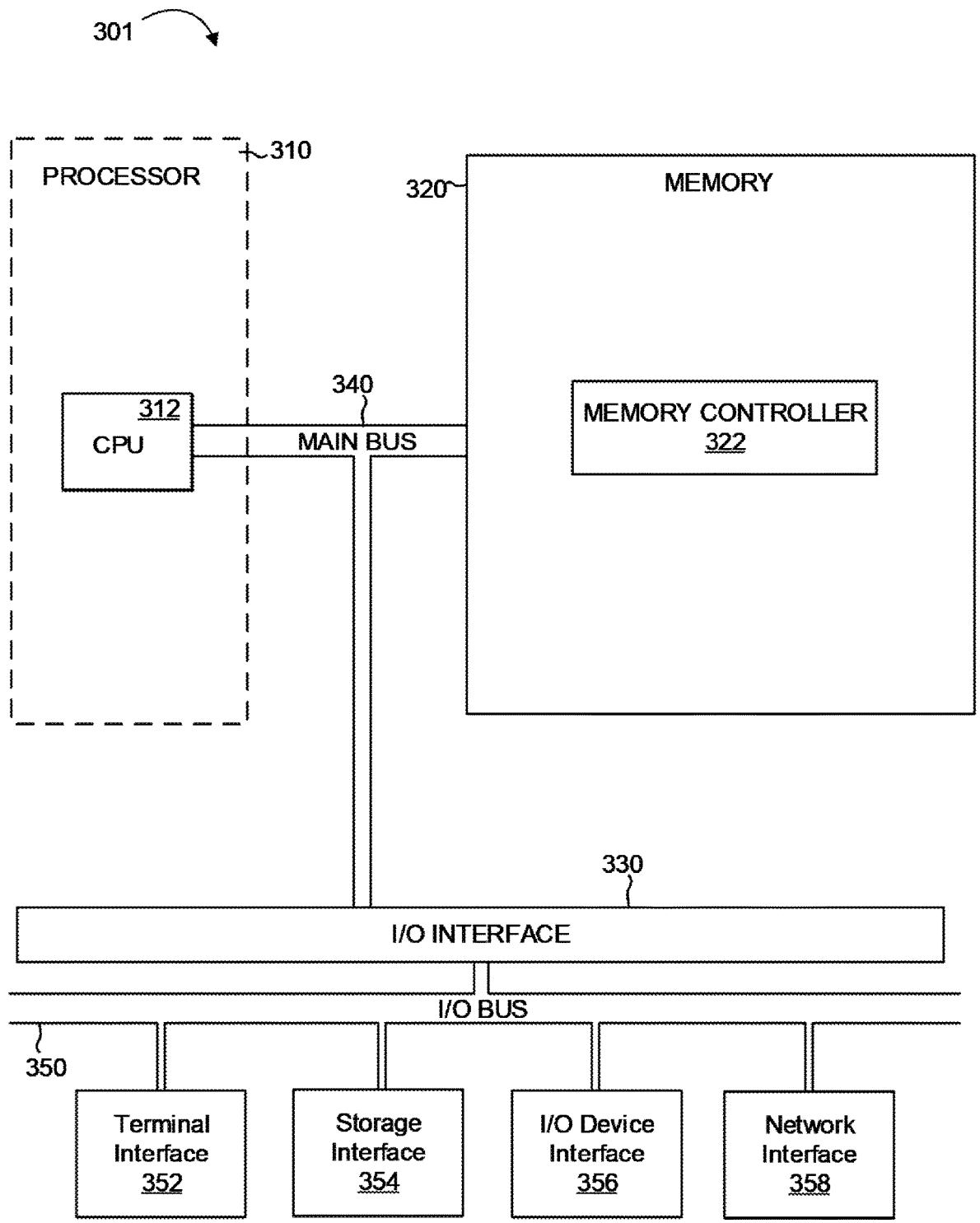
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or nonvolatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301— including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

Computer System 301, or portions thereof, can be incorporated into one or more components of computing device 190, security cable 120, and/or security cable set 200, in accordance with various embodiments of the present disclosure. For example, aspects of Computer System 301 can be incorporated into electronic circuit 162 for transmitting instructions to processor 176.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A security cable comprising:
   a restraining cable; and
   a lock unit attached to the restraining cable,
   the lock unit configured to removably fasten to a computing device,
   the lock unit further configured to switch the security cable between a first configuration, a second configuration, and a third configuration based on wireless communication with a security cable key,
   wherein, in the first configuration, the lock unit is fastened to the computing device and a first instruction is transmitted from an electronic circuit of the lock unit to a processor of the computing device that places the computing device in an inactive state,
   wherein, in the second configuration, the lock unit is removable from the computing device and a second instruction is transmitted from the electronic circuit of the lock unit to the processor of the computing device that places the computing device in an active state,
   wherein, in the third configuration, the lock unit is removable from the computing device and the computing device remains in the inactive state,
   wherein the security cable further comprises a first electronic coupling, and the security cable is configured to supply operating power to the computing device through the first electronic coupling, and
   wherein the first electronic coupling is configured to transmit a data signal to a processor of the computing device through a second coupling, wherein the data signal includes identification information of the security cable.

2. The security cable of claim 1, wherein the security cable switches between the first configuration, the second configuration, and the third configuration in response to an interaction between the security cable key and a key interface of the lock unit.

3. The security cable of claim 1, wherein the lock unit further comprises set of retractable tabs, wherein the set of retractable tabs is placed into a protruded position in response to an interaction between the security cable key and a key interface of the lock unit.

4. The security cable of claim 3, wherein the set of retractable tabs is configured to transmit the first instruction and the second instruction from the electronic circuit of the lock unit to the processor of the computing device.

5. The security cable of claim 1, wherein the restraining cable is configured to tether the computing device to a stationary object when the security cable is in the first configuration.

6. The security cable of claim 1, wherein the identification information includes an alphanumeric identification code.

7. The security cable of claim 6, wherein the computing device is configured to compare the alphanumeric identification code to a stored alphanumeric identification code.

8. The security cable of claim 7, wherein the computing device is configured to prohibit receiving power from the security cable in response to the alphanumeric identification code and the stored alphanumeric identification code not matching.

9. The security cable of claim 7, wherein the computing device is configured to enable receiving power from the security cable in response to the alphanumeric identification code and the stored alphanumeric identification code matching.

10. A system comprising:
a computing device; and
a security cable comprising a lock unit attached to a restraining cable;
the lock unit configured to removably fasten to the computing device,
the lock unit further configured to switch the security cable between a first configuration, a second configuration, and a third configuration based on wireless communication with a security cable key,
wherein, in the first configuration, the lock unit is fastened to the computing device and a first instruction is transmitted from an electronic circuit of the lock unit to a processor of the computing device that places the computing device in an inactive state,
wherein, in the second configuration, the lock unit is removable from the computing device and a second instruction is transmitted from the electronic circuit of the lock unit to the processor of the computing device that places the computing device in an active state,
wherein, in the third configuration, the lock unit is removable from the computing device and the computing device remains in the inactive state,
wherein the security cable further comprises a first electronic coupling, and the security cable is configured to supply operating power to the computing device through the first electronic coupling, and
wherein the first electronic coupling is configured to transmit a data signal to a processor of the computing device through a second coupling, wherein the data signal includes identification information of the security cable.

11. The system of claim 10, wherein the security cable switches between the first configuration, the second configuration, and the third configuration in response to an interaction between the security cable key and a key interface of the lock unit.

12. The system of claim 10, wherein the lock unit further comprises set of retractable tabs, wherein the set of retractable tabs is placed into a protruded position in response to an interaction between the security cable key and a key interface of the lock unit.

13. The system of claim 12, wherein the set of retractable tabs is configured to transmit the first instruction and the second instruction from the electronic circuit of the lock unit to the processor of the computing device.

14. A security cable comprising:
a restraining cable;
a lock unit attached to the restraining cable,
the lock unit having a key interface, wherein the security cable switches between a first configuration, a second configuration, and a third configuration in response to wireless communication between a security cable key and the key interface,
the lock unit comprising a set of retractable tabs, the set of retractable tabs configured to removably fasten the lock unit to a computing device,
wherein, in the first configuration, the set of retractable tabs is in a protruded position, resulting in the lock unit being fastened to the computing device and the computing device being tethered to a stationary object,
wherein, in the first configuration, the lock unit places the computing device in an inactive state by transmitting a first instruction from an electronic circuit of the lock unit to a processor of the computing device,
wherein, in the second configuration, the lock unit is removable from the computing device and a second instruction is transmitted from the electronic circuit of the lock unit to the processor of the computing device that places the computing device in an active state,
wherein, in the third configuration, the lock unit is removable from the computing device and the computing device remains in the inactive state,
wherein the security cable further comprises a first electronic coupling, and wherein the security cable is configured to supply operating power to the computing device through the first electronic coupling, and
wherein the first electronic coupling is configured to transmit a data signal to the processor of the computing device through a second coupling, wherein the data signal includes identification information of the security cable.

* * * * *